US005542345A

United States Patent [19]
Gongwer

[11] Patent Number: 5,542,345
[45] Date of Patent: Aug. 6, 1996

[54] DEFLECTOR FOR AN AUTOMATIC FOOD COOKING MACHINE

[75] Inventor: Todd Gongwer, Wakarusa, Ind.

[73] Assignee: Nelgro Mfg. Corp., Wakarusa, Ind.

[21] Appl. No.: 490,621

[22] Filed: Jun. 15, 1995

[51] Int. Cl.⁶ .................. A47J 37/00; A47J 37/04
[52] U.S. Cl. .................. 99/345; 99/400; 99/401; 99/443 C; 99/446; 99/447
[58] Field of Search .............. 99/345–347, 386, 99/389, 391, 400, 401, 402, 427, 443 R, 443 C, 444–446, 448, 447, 450, 477–479

[56] References Cited

U.S. PATENT DOCUMENTS

| | | | |
|---|---|---|---|
| 3,499,380 | 3/1970 | Gongwer | 99/427 |
| 3,965,807 | 6/1976 | Baker | 99/375 |
| 4,453,457 | 6/1984 | Gongwer et al. | 99/443 C |
| 4,599,938 | 7/1986 | Gongwer | 99/446 |
| 4,600,596 | 7/1986 | Gongwer et al. | 99/448 |
| 4,947,741 | 8/1990 | Gongwer | 99/386 |
| 4,986,174 | 1/1991 | Gongwer | 99/477 |
| 5,121,676 | 6/1992 | Jurgens | 99/340 |

*Primary Examiner*—Timothy F. Simone
*Attorney, Agent, or Firm*—Baker & Daniels

[57] ABSTRACT

A deflector shield for an automatic food cooking machine. The automatic food cooking machine of the present invention includes a deflector shield that protects the gas outlet ports from grease, drippings, and other debris falling from the cooking food products. The shields are heated by the gas flames and therefore cook the food by radiant heat, while convective heat is directed around the edges of the shields and towards the food. Finally, the shields serve to protect the food products from direct exposure to the gas flames as required by USDA regulations.

12 Claims, 3 Drawing Sheets

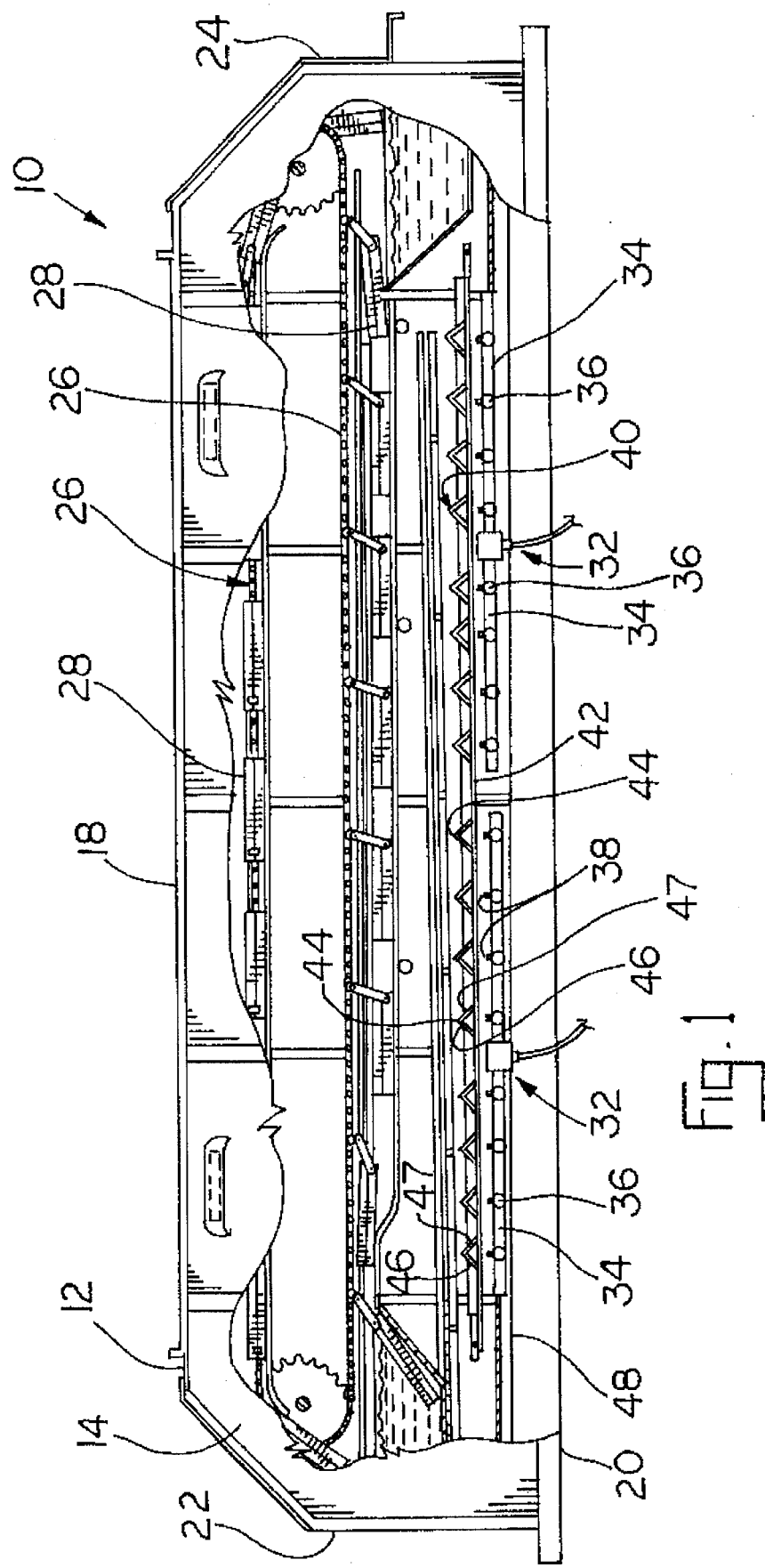

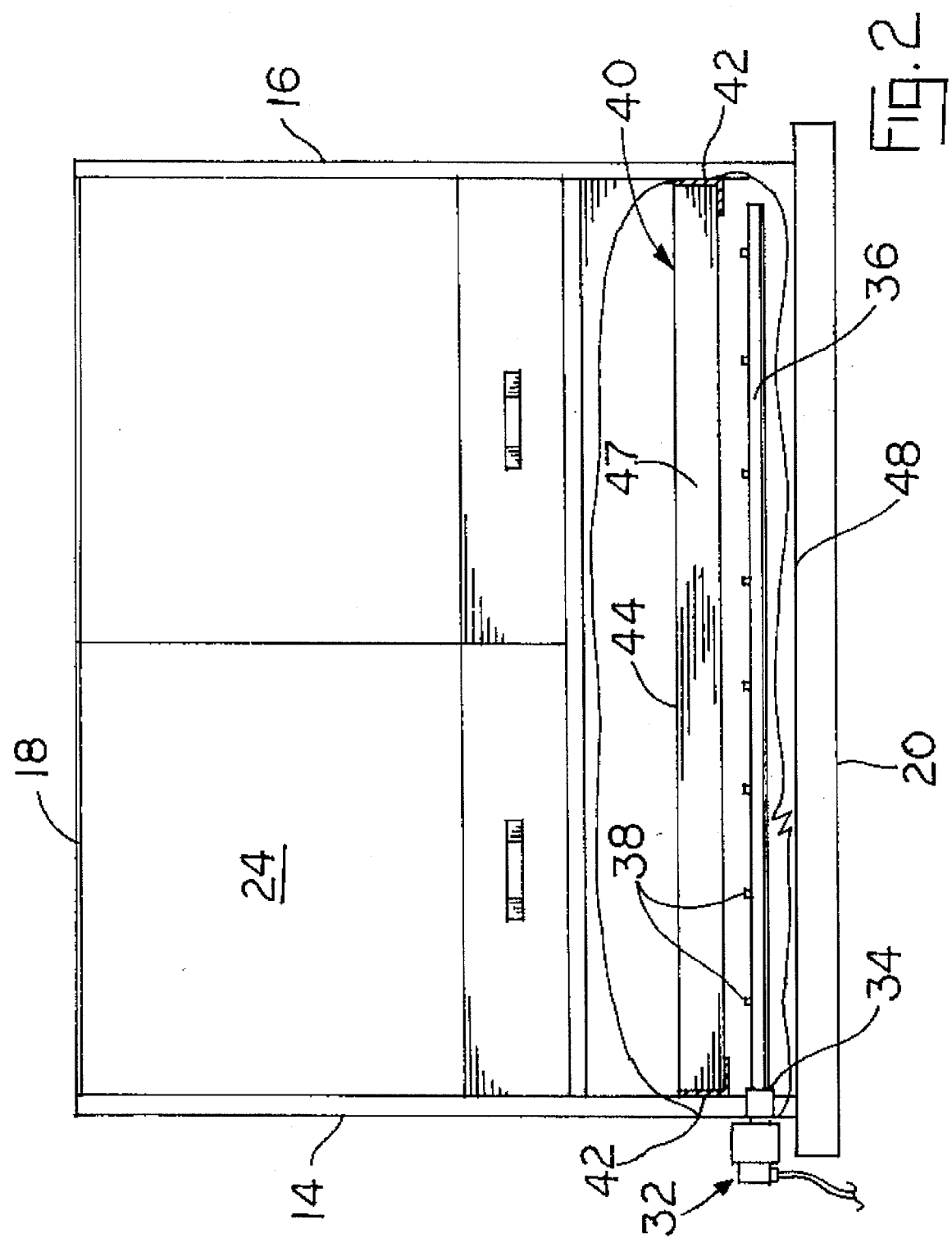

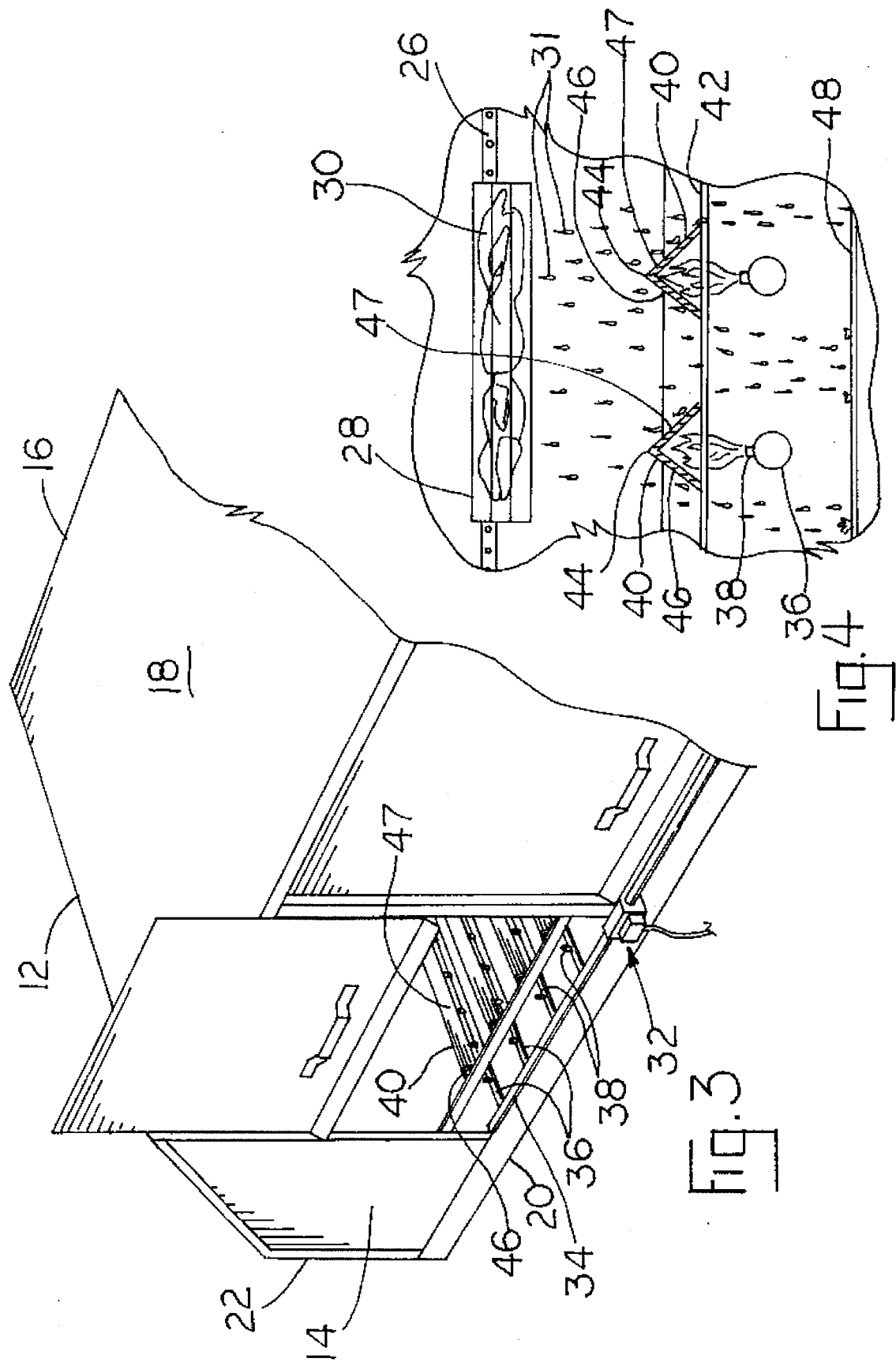

DEFLECTOR FOR AN AUTOMATIC FOOD COOKING MACHINE

BACKGROUND AND SUMMARY OF THE INVENTION

This invention relates to an automatic food cooking machine.

Automatic food cooking machines are generally well known in the art. In general, automatic food cooking machines use a conveyor system that slowly transports the food to be-cooked over a heat source. Under regulations promulgated by the United States Department of Agriculture (USDA), the food products must be loaded and unloaded at separate locations by separate personnel. Additionally, USDA regulations require that the food must be protected from direct exposure to the heat source.

Many automatic cooking machines are known in the art that comply with USDA regulations. For example, my previous automatic cooker includes a continuous conveyor that allows the food to make more than one pass over the heat source, thereby allowing a longer cooking time. For a more complete discussion of automatic food cooking machines, see my U.S. Pat. No. 4,947,741. During the cooking process a certain amount of grease, drippings, and other debris falls from the cooking food. If such items come into contact with the heat source the cooking process may be interrupted. For example, cookers typically use gas jets as the heat source, and if the jets become clogged the flame may go out or flare up, thus increasing smoke and/or reducing efficiency. Therefore, the heat source must be protected from the drippings.

One approach in the past has been to provide a continuous plate located between the heat source and the food products. The plate is heated by the heat source, such as gas jets, and the food is thus cooked by radiant heat. The plate also serves to protect the heat source and collect the drippings. However, the drippings drop onto the hot plate, which tends to create more smoke.

The present invention eliminates the problem discussed above by placing an angled deflector shield over the heating source. The angled deflector shield performs several functions. First, by virtue of its placement over the heating source, the deflector shield is heated by the gas jets and thus serves to cook the food by radiating heat. Secondly, convective heat is directed by the edges of the deflector shield and also serves to cook the food products. Finally, the drippings that have been deflected can be collected below the heat source, which thereby significantly reduces the amount of smoke.

Accordingly, it is an object of this invention to provide an automatic food cooker in which the heating source is protected from food drippings.

It is another object of this invention to provide an automatic food cooker that includes a shield for the heating source that allows cooking by radiant as well as convective heat.

A further object of this invention is to provide an automatic food cooker that collects food drippings at a point below the heat source.

A still further object of this invention is to provide an automatic food cooker that produces less smoke.

Other objects of this invention will become apparent upon a reading of the following description taken with the accompanying drawings.

BRIEF DESCRIPTION OF THE DRAWINGS

FIG. 1 is a front elevational view, partly in section, of the automatic food cooking machine of the present invention;

FIG. 2 is a right side elevational view, partly in section, of the automatic food cooking machine illustrated in FIG. 1;

FIG. 3 is a fragmentary perspective view of the automatic food cooking machine illustrated in FIGS. 1 and 2;

FIG. 4 is a fragmentary sectional view, taken from the front, of the automatic food cooking machine illustrated in FIGS. 1 through 3 showing drippings falling from the cooking food products.

DESCRIPTION OF THE PREFERRED EMBODIMENT

The preferred embodiment herein described is not intended to be exhaustive or to limit the invention to the precise form disclosed. Rather, it is chosen and described in order to illustrate the principles involved and to enable others skilled in the art to follow its teachings.

Referring now to the drawings, an automatic food cooking machine 10 includes a housing 12 having side walls 14, 16 and interconnecting top and bottom walls 18, 20. Housing 12 further includes end walls 22, 24. A continuous conveyor 26 circulates within housing 12. A plurality of food carriers 28 for carrying food products 30 are attached to conveyor 26 for circulation through housing 12. During the cooking process, grease, debris, and/or drippings 31 fall from the food products 30 towards bottom wall 20 of housing 12. For a more complete understanding of the construction and operation of conveyor 26 and food carriers 28, refer to U.S. Pat. Nos. 3,499,380 and 4,947,741, which are incorporated herein by reference.

Heating element 32 is disposed within housing 12 below carriers 28 and conveyor 26. Heating element 32 includes supply manifold 34 and a number of burner assemblies 36. Each burner assembly 36 includes one or more gas outlet ports 38 which are sized to hold a flame upon ignition. Heating element 32 is connected to a pressurized gas supply source (not shown) as is common in the industry. Burner assemblies 36 are connected to supply manifold 34 in spaced apart parallel relationship. Burner assemblies 36 extend substantially across housing 12 from front wall 14 to rear wall 16, with outlet ports 38 spaced at intervals along burner assembly 36 to provide even distribution of heat.

A number of shield plates 40 are mounted to walls 14 and 16 of housing 12 by mounting brackets 42 in spaced apart parallel arrangement so that each shield plate 40 is parallel to and positioned over an adjacent burner assembly 36. Each shield plate 40 includes a central ridge 44 and a pair of plates 46, 47 diverging from the common central ridge 44. Central ridge 44 of shield plate 40 is positioned over outlet ports 38 of adjacent burner assembly 36. Collection plate 48 is mounted to housing 12 below the shield plates 40 and burner assemblies 36.

In operation, food products 30 are placed in carriers 28, which are then removably attached to conveyor 26. Conveyor 26 is driven by a conventional drive source (not shown) so that the carriers 28 containing food products are passed over heating element 32 which has been ignited so that gas flames are supported by the pressurized gas emerging from gas outlet ports 38. The continuous conveyor allows the food products to circulate over the heating element a number of times to allow for more complete cooking.

The flames emerging from gas outlet ports 38 of each burner assembly 36 heat the adjacent shield plate 40 so that it radiates heat towards the food products. Further, the spacing between adjacent shield plates 40 allows convective heat to circulate about the edges of diverging plates 46, 47 of shield plate 40 which further serves to cook the food products. While the food products 30 are cooking, grease, debris and/or drippings 31 fall from the food products towards the gas outlet ports 38. Instead of coming into contact with the outlet ports, the drippings 31 are deflected by the diverging plates 46, 47 of shield plate 40. The drippings are guided down the diverging plates 46, 47 of each shield plate 40 and fall to the collection plate 48 below. The collection plate can be angled to facilitate flow of the drippings to a collection point (not shown) as is common in the industry.

It is understood that the above description does not limit the invention to the above-given details, but may be modified within the scope of the following claims.

I claim:

1. An automatic cooking machine including:

a frame;

a housing supported on said frame, said housing having a pair of spaced side walls, an interconnecting top wall and bottom wall, and a pair of end walls;

heating means disposed in said housing for elevating the temperature therein to allow cooking of food products; and conveyor means disposed in said housing above said heating means for holding and transporting food products to be cooked by the heating means, said food products producing drippings during cooking;

said heating means including a plurality of substantially parallel gas burner conduits disposed below said conveyor means, each of said gas burner conduits including a plurality of gas outlet ports, the improvement comprising:

shield means disposed substantially parallel to said gas burner conduits and over said outlet ports and between said outlet ports and said conveyor means for deflecting drippings falling from said food products away from said outlet ports and for directing convective heat to said food products, said shield means further being sufficiently close to said outlet ports to heat said shield means for directing radiant heat to said food products.

2. An automatic cooking machine as claimed in claim 1, wherein said shield means includes mounting means for mounting said shield means to said housing.

3. An automatic cooking machine as claimed in claim 2, wherein said shield means includes deflector shields spaced at intervals within said housing.

4. An automatic cooking machine as claimed in claim 3, wherein said deflector shields include at least one angled surface.

5. An automatic cooking machine as claimed in claim 4, wherein each of said deflector shields includes a central ridge part and a pair of diverging plates extending from said ridge part.

6. An automatic cooking machine as claimed in claim 1, wherein said shield means includes mounting means for mounting said shield means to said frame.

7. An automatic cooking machine as claimed in claim 1, including a collection plate for collecting said drippings, said collection plate being disposed below said heating means.

8. An automatic cooking machine including:

a frame;

a housing supported on said frame, said housing having a pair of spaced side walls, an interconnecting top wall and bottom wall, and a pair of end walls;

heating means disposed in said housing for elevating the temperature therein to allow cooking of food products; and conveyor means disposed in said housing above said heating means for holding and transporting food products to be cooked by the heating means, said food products producing drippings during cooking;

said heating means including a plurality of substantially parallel gas burner conduits disposed below said conveyor means, each of said gas burner conduits including a plurality of gas outlet ports, the improvement comprising:

shield means disposed substantially parallel to said gas burner conduits and over said outlet ports and between said outlet ports and said conveyor means for deflecting drippings falling from said food products away from said outlet ports and for directing convective heat to said food products, said shield means further being sufficiently close to said outlet ports to heat said shield means for directing radiant heat to said food products; and a collection plate disposed below said heating means for collecting said drippings, wherein said collection plate is disposed at an angles orientation to facilitate flow of drippings towards a collection point.

9. An automatic cooking machine as claimed in claim 8, wherein said shield means includes mounting means for mounting said shield means to said housing.

10. An automatic cooking machine as claimed in claim 9, wherein said shield means includes deflector shields spaced at intervals within said housing.

11. An automatic cooking machine as claimed in claim 10, wherein each of said deflector shields includes a central ridge part and a pair of diverging plates extending from said ridge part.

12. An automatic cooking machine as claimed in claim 8, wherein said shield means includes mounting means for mounting said shield means to said frame.

* * * * *